United States Patent
Schultz et al.

(10) Patent No.: US 11,849,750 B2
(45) Date of Patent: Dec. 26, 2023

(54) TOOL ASSISTED ROTARY DRUM SKINSHEET CLAMP

(71) Applicant: Lyco Manufacturing Inc., Columbus, WI (US)

(72) Inventors: Steven J. Schultz, Beaver Dam, WI (US); Daniel D. Maupin, Corvallis, OR (US)

(*) Notice: Subject to any disclaimer, the term of this patent is extended or adjusted under 35 U.S.C. 154(b) by 725 days.

(21) Appl. No.: 17/030,199

(22) Filed: Sep. 23, 2020

(65) Prior Publication Data

US 2021/0084958 A1 Mar. 25, 2021

Related U.S. Application Data (60) Provisional application No. 62/904,521, filed on Sep. 23, 2019.

(51) Int. Cl.
*A23N 12/04* (2006.01)

(52) U.S. Cl.
CPC ................................. *A23N 12/04* (2013.01)

(58) Field of Classification Search
CPC ...... A23N 12/02; A23N 12/023; A23N 12/04; A23N 12/06; F16B 3/00; A23L 3/165; A23L 3/18; A23L 3/185; A23L 5/11; A23L 5/10; A23L 5/13; A23L 5/15; A23B 7/06

See application file for complete search history.

(56) References Cited

U.S. PATENT DOCUMENTS

| | | |
|---|---|---|
| 5,329,842 A | 7/1994 | Zittel |
| 5,669,288 A | 9/1997 | Zittel et al. |
| 6,095,035 A | 8/2000 | Zittel et al. |
| 6,105,485 A | 8/2000 | Zittel |
| 6,205,913 B1 | 3/2001 | Zittel et al. |
| 6,263,785 B1 | 7/2001 | Zittel |
| 7,168,846 B1 | 1/2007 | Maupin |
| RE40,232 E | 4/2008 | Zittel et al. |
| 7,500,426 B2 | 3/2009 | Zittel et al. |
| RE42,732 E | 9/2011 | Zittel et al. |
| 8,739,691 B2 | 6/2014 | Zittel et al. |
| 8,800,435 B2 | 8/2014 | Maupin et al. |
| 9,452,899 B2 | 1/2016 | Stousland et al. |
| 2017/0196252 A1 | 7/2017 | Maupin et al. |

*Primary Examiner* — Hung D Nguyen
(74) *Attorney, Agent, or Firm* — George R. Corrigan (57) ABSTRACT

A rotary drum blancher/cooler includes skinsheet sections alternating with structural channels and clamps. The skinsheet sections and channels have sidewalls. Each clamp includes at least a portion of a clamp bar, a bolt, a slot and hole combination, and a nut. The clamp bar holds each skinsheet sidewall between the channel sidewall and the clamp bar. The bolt extends through a hole in the clamp bar. The bolt has a first partially threaded end and a second end with at least one groove. One end is within the channel, and the other outside. A slot and hole combination is located in at least one of a retaining plate, channel sidewall and clamp bar. The bolt can pass through the hole of the slot and hole combination, and the groove(s) in the bolt are disposed within the slot to prevent rotation of the bolt. The nut is on the first end, and may be tightened or loosened to tighten or loosen the skinsheet side wall to the channel sidewall.

20 Claims, 7 Drawing Sheets

TOOL ASSISTED ROTARY DRUM SKINSHEET CLAMP

FIELD OF THE INVENTION

The present disclosure relates generally to the art of rotary drum blancher/coolers. More specifically, it relates to rotary drum blancher/coolers with skinsheets attached thereto.

BACKGROUND OF THE INVENTION

Rotary drum blancher/coolers are well known for gently handling food product. One example of a rotary drum blancher/cooler is found US in U.S. Pat. No. 5,669,288, which is hereby incorporated by reference. Other rotary drum blancher/coolers may be found in U.S. Pat. No. 9,452,899, entitled Transfer mechanism for use with a food processing system; U.S. Pat. No. 8,800,435, entitled Rotary screw blancher with fluid passage and fluid agitation; U.S. Pat. No. 8,739,691, entitled Rotary screw blancher; RE42,732, entitled Rotary blancher for processing food product; U.S. Pat. No. 5,329,842, entitled Combination blancher and cooler; U.S. Pat. No. 6,095,035, entitled Dual drum food processor; U.S. Pat. No. 6,105,485, entitled Pressurized rotary blancher; U.S. Pat. No. 6,263,785, entitled Blancher and method of operation; U.S. Pat. No. 7,500,426, entitled Rotary cooker and cooler with improved product transfer mechanism; RE40,232, entitled Method for processing food product; U.S. Pat. No. 7,168,846, entitled Rotary processing device; and U.S. Pat. No. 6,205,913, entitled Rotary drum blancher for cooking food include, each of which are also hereby incorporated by reference.

Rotary blancher/coolers generally include skinsheets which define the rotary drum in which blanching occurs. Rotary Drum Blancher/coolers use skinsheets to contain the product within the center of the cylinder during processing, and to maintain the integrity of the cylinder structure. Skinsheet tightness is an important part of both of these functions. Skinsheet, as used herein, refers to the skin forming the drum.

Many prior art rotary blancher/coolers have bolted-on skinsheets which create a very tight strong cylinder, but have overlapping areas that are difficult to clean. The skinsheet has sections that collectively define the drum, but each individually defines only part of the drum. Sections typically extend circumferentially—for example six sections might each extend slightly more than 30 degrees each, so that with overlapping they extend the entire circumference (360 degrees). Other designs have more than skinsheets and channels forming the drum, For example, one design provides for a skinsheet section adjacent a structural channel, and includes removable doors for additional cleaning access between pairs of adjacent skinsheet/channels. In such a design the skinsheets and adjacent channels for part of the drum, and the removable doors form part of the drum.

Prior art from the owner of this invention includes coreless cylinders, removable cleaning doors, CIP (Clean-in-place) skinsheet clamps, and totally removable skinsheets. All of these features add cleanability, but can slightly compromise the strength of the cylinder structure.

Totally removable skinsheets give full cleaning access, but can be cumbersome to remove, store, clean, and install exactly in the same location. The skinsheet sections are unbolted and each section removed. Totally removable skinsheets with clamps have also been used, but offer less tightening capability. Totally removable clamp, as used herein, refers to a clamp that allows the skinsheet to be totally removed when the clamp is opened (also referred to as disengaged).

The owner of this invention, LYCO Manufacturing, developed CIP (clean in place) skinsheets which opens up overlapping sections by separating sections, but the sections are not removed. These skinsheets were an improvement over other prior art skinsheets, because they were easier to clean. LYCO prior art CIP (clean in place) skinsheet clamps have similar strength of bolted skinsheets, but allow the ability to loosen up during cleaning. See U.S. patent application Ser. No. 15/403,701, published as US2017-0196252, and incorporated by reference.

Clean in place skin sheets sometimes use clamps to hold the skin sheet in place. However, CIP systems can have disadvantages, such as the durability of the clamp, ease of opening of the clamp, clearance of the clamp while rotating and still missing other components in the machine, loosening of the clamp over time, and the inability of the clamp to open up the interface between the cylinder's structural channels and the skinsheet. Clean in place clamp, refers to a clamp that allows the skinsheet to be cleaned in place when the clamp is opened (also referred to as disengaged).

Prior art clamps often had insufficient size and force to be easily adjusted, maintain that tightness over time, and have sufficient tension to keep the skinsheets tight against the structural channels. Longevity and strength of the entire blancher/cooler cylinder is dependent on the tightness of the skinsheets. Insufficient tension on the skinsheets will cause excessive stress within the cylinder when turned and loaded with product. Moreover, most clamps must be factory installed—it is hard to retrofit any existing clean in place clamps on blancher/coolers already in use.

Accordingly, a way to clamp skinsheets that is durable, able to be retrofitted, provides clearance while operating, does not loosen over time, and opens (allows access to) the interface between the cylinder's structural channels and the skinsheet is desired.

SUMMARY OF THE PRESENT INVENTION

According to a first aspect of the disclosure a rotary drum blancher/cooler for processing food includes a skinsheet having of a plurality of sections alternating with a plurality of structural channels, and a plurality of clamps. Each skinsheet section has skinsheet side wall at opposing ends, and each structural channel has channel sidewalls at opposing edges. Each clamp includes at least a portion of a clamp bar, a bolt, a slot and hole combination, and a nut. The portion of a clamp bar holds each skinsheet sidewall between a structural channel sidewall and the clamp bar. The bolt extends through a hole in the portion of the clamp bar. The bolt has a first end at least partially threaded and a second end with at least one groove. One of the first end and second end is disposed within the structural channel, and the other is disposed outside the structural channel. A slot and hole combination is located in at least one of a retaining plate, the structural channel sidewall and the clamp bar. The bolt can pass through the hole of the slot and hole combination, and the at least one groove in the bolt is disposed within the slot, such that the bolt cannot rotate with respect to the slot. The nut is mounted on the first end, and the nut may be tightened to hold the skinsheet sidewall against the channel sidewall or loosened to allow the skinsheet side wall to move away from the structural channel side wall.

According to a second aspect of the disclosure a clamp for a rotary drum blancher/cooler is described. The rotary drum blancher/cooler is for processing food an includes a drum made of a skinsheet having a plurality of sections alternating with structural channels. Each section has sidewalls at opposing ends. Each structural channel has channel sidewalls at opposing edges. Each clamp comprises at least a portion of a clamp bar, a bolt, a slot and hole combination, and a nut. The clamp bar holds each skinsheet sidewall between a structural channel sidewall and the clamp bar and the at least a portion of the clamp bar has at least one clamp bar hole therein. The bolt extends through the at least one hole in the at least a portion of the clamp bar, and has a first end at least partially threaded, and a second end with at least one groove. One of the first end and second end is disposed within the structural channel, and the other end is disposed outside the structural channel. The bolt can pass through the hole of the slot and hole combination. When the bolt is disposed within the slot the bolt cannot rotate with respect to the slot. The slot and hole combination is located in at least one of a retaining plate, the channel sidewall and the clamp bar. The nut is mounted on the first end, and the nut may be turned to hold the skinsheet sidewall against the channel sidewall or to allow the skinsheet side wall to move away from the structural channel side wall.

The slot and hole combination are located in the retaining plate, and the retaining plate is disposed such that rotation of the retaining plate with respect to at least one of the structural channel and the clamp bar is prevented in various embodiments.

The retaining plate is disposed in the structural channel such that rotation of the retaining plate with respect to the structural channel is prevented, and the second end of the bolt is located outside of the respective structural channel in one alternative The rotary drum blancher/cooler of includes a nut retaining ring mounted on the second end of the bolt in various embodiments.

The shape of the clamp bar prevents rotation of the plate in one alternative.

The clamp bar includes a part that extends into the structural channel that prevents rotation of the plate in another alternative.

The shape of the respective structural channel prevents rotation of the plate in one embodiment.

The channel includes a tangential floor that prevents rotation of the plate in various embodiments.

The at least one groove is two grooves in one alternative.

The retaining plate is disposed outside of the respective structural channel and the first end is located in the respective structural channel, and the shape clamp bar prevents rotation of the plate in another alternative.

The slot and hole combination are located in the structural channel sidewall in one embodiment.

The slot and hole combination are located in the respective the clamp bar in various embodiments.

The bolt is a clamp draw in one alternative.

Other principal features and advantages of will become apparent to those skilled in the art upon review of the following drawings, the detailed description and the appended claims.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular clamp and catch, it should be understood at the outset that other clamps and catches can be used to implement the invention, and that the clamps and catches can be used in other environments. The invention can be used with any rotary drum blancher/cooler.

Figure 1:
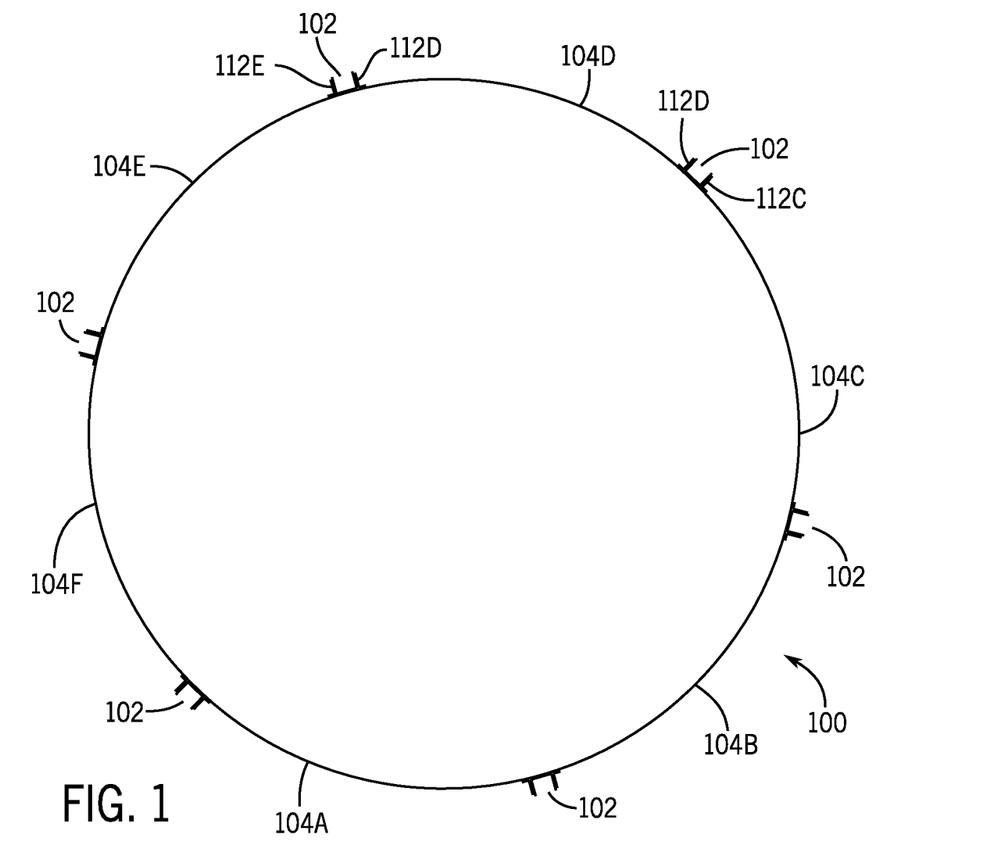
FIG. 1 is a cross section of a drum skinsheet.

This disclosure describes a clamp that can be used to hold a skinsheet to structural channels to form the drum of a blancher/cooler. Preferably, it can be retrofitted to existing blancher/coolers. Blancher/cooler, as used herein, refers to a device to blanch and/or cool product. Multiple sections (2, 3 4, 6, 8 or more in various embodiments) of the skinsheet for the drum. Collectively the sections and structural channels extend the entire circumference (in the circumferential direction) of the drum. Individually each section extends less than the entire circumference of the drum. FIG. 1 shows a cross section of a drum 100 comprised of eight sections 104 a-104f Side walls 112 are at the edge of each section. Structural channels 102 alternate with the drum sections 104. Clamps are used to hold the side walls 112 of skin sheets 104 to the structural channels 102. Collectively the skinsheet sections and structural channels form the entire drum. The skinsheet sections collectively extend the entire length in the circumferential direction to form the circumference, but each of section individually extends less than the entire circumference in the circumferential direction to form only a portion of the circumference. One section and one adjacent channel of FIG. 1 combine to complete 60 degrees (⅙th of the circumference, although alternatives provide for sections of different sizes and a different number of sections). Another alternative provides for other components of the drum, such as removable doors. This design can have the channel adjacent a respective skinsheet section, and the door adjacent the channel.

Figure 2:
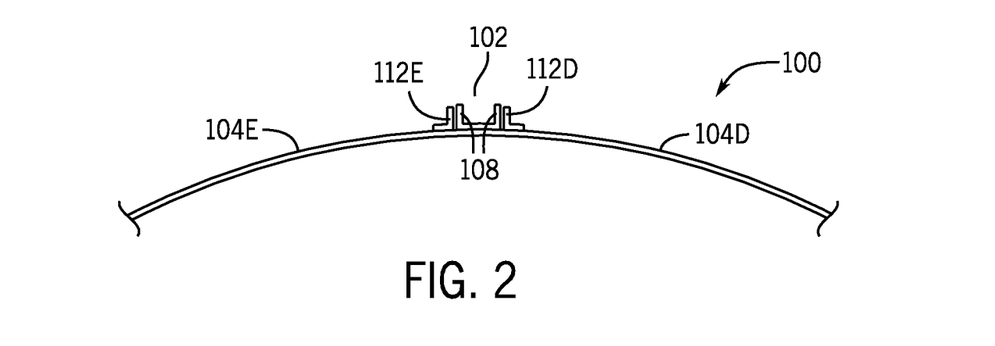
FIG. 2 is a portion of the cross section of the drum skinsheet of FIG. 1.

FIG. 2 shows a portion of drum 100, where skinsheet section 104e has side wall 112e adjacent a side wall 108 of structural channel 102. Side walls 112 and 107 extend away from the surface of the drum, although they could be more partially tangential Extending away from a surface of the drum, as used herein, refers to extending in a generally radial direction. Also, skinsheet section 104d has side wall 112d adjacent a side wall 108 of structural channel 102. The clamp described below holds side walls 112 tightly to sidewalls 108 (of structural channel 102) when in a clamping position. Clamping position, for a clamp, as used herein, refers to a position where the clamp holds adjacent sections (or other objects being clamped) together. Holds a skinsheet section to a structural channel, as used herein, refers to clamping the skinsheet tightly to the structural channel so that the drum can be used to operate and cool/blanch product. When the clamp is in the release position side walls 112 are allowed to move away from sidewalls 108 (of structural channel 102). Release position, for a clamp, as used herein, refers to a position where the clamp does not hold adjacent sections (or other objects being clamped) together. Allows a skinsheet sections to move away from the structural channel, as used herein, refers to releasing the skinsheet from the structural channel so that it may be cleaned (either by removing or cleaning in place).

The clamps are bolts, cooperating with a slot and hole combination (preferably in a retaining plate) and having a nut, and can be used with existing blancher/coolers. In the preferred embodiment, the bolt (or draw) pulls against at least a portion of a skinsheet clamp bar when the clamp is in the clamping position or operating position. Skinsheet clamp bar, as used herein, refers to the portion of the clamp outside of the structural channel that moves to hold the skinsheet tightly to the structural channel, or allows the skinsheet to move away from the structural channel. The clamp can be moved to a release position or cleaning position to allow for cleaning. Operating position, as used herein, refers to the skinsheet section being held tightly to the structural channel so that the drum can be used to cool/blanch product. Cleaning position, as used herein, refers to the skinsheet being distanced from the structural channel so that it may be cleaned (either by removing or cleaning in place). Moving between operating and cleaning positions is preferably done by loosening a nut. This design allows for retrofitting many existing blancher/coolers because the design does not require special parts or machining on the blancher/cooler.

Groove in a bolt, as used herein, refers to a cutout in a bolt that changes the width of a portion of the bolt, and extends only a portion of the circumference of the bolt, and only a portion of the length of the bolt. Retaining plate, as used herein, refers to a structure that retains a bolt other than by threadedly connection, and that its shape and position prevent rotation of the retaining plate relative to adjacent structures. Slot and hole combination, as used herein, refers to a hole sized to accept a bolt adjacent a slot that is narrower than the bolt's nominal diameter, such that the bolt needs at least one groove to fit within the slot. Thus, a bolt with at least one groove can be inserted into the hole, and when the groove is aligned with the slot the bolt can be disposed in the slot.

The clamp is preferably located partially within the structural channel. Structural channel, as used herein, refers to the rigid channels that help define the structure of the drum. Within the structural channel, as used herein, refers to the area between opposing side walls of the structural channel, and can extend above the structural channel.

Figure 3:
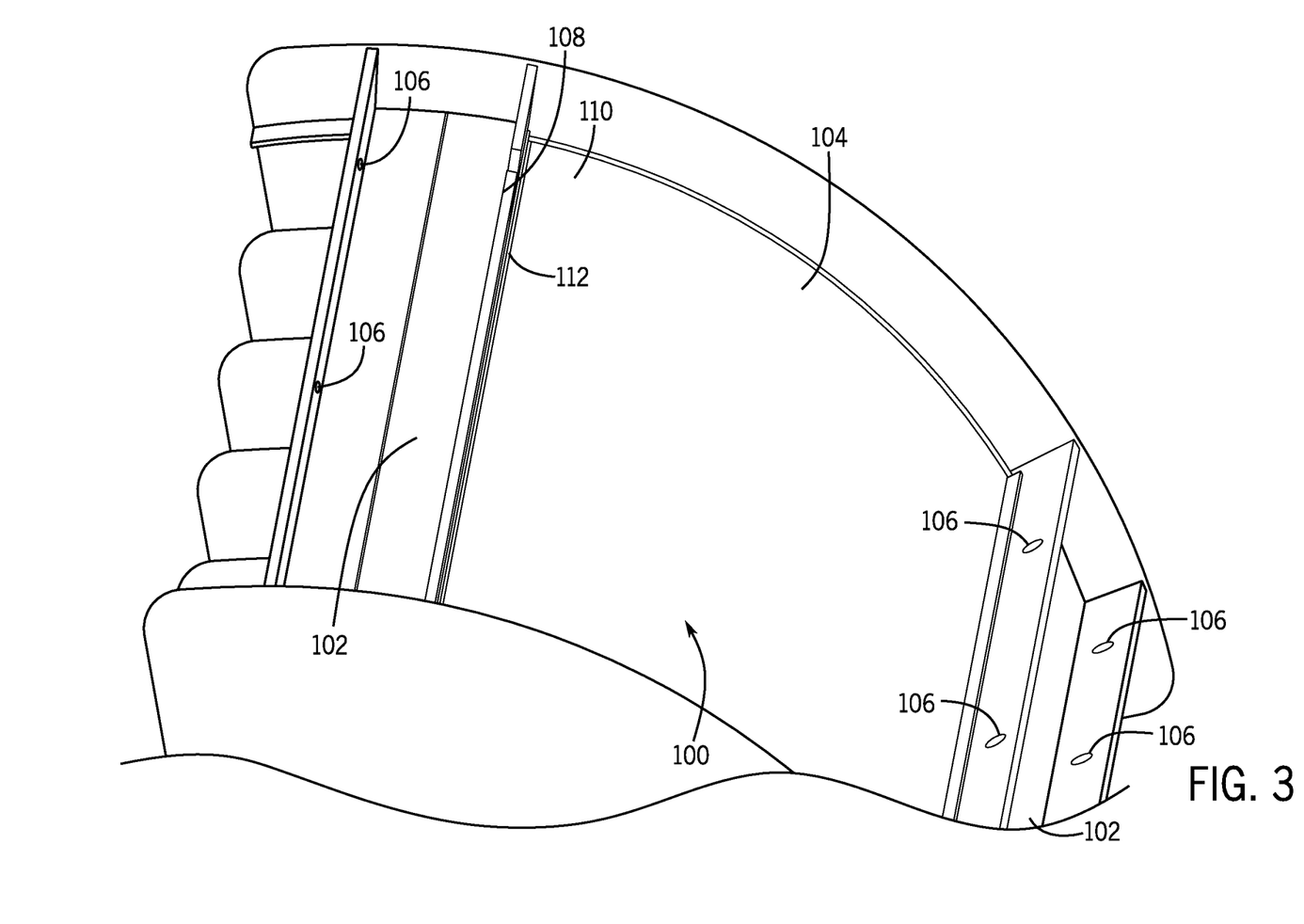
FIG. 3 is portion of a drum with a skinsheets and structural channels.

FIG. 3 shows a portion of drum 100. Side walls 108 of structural channels 102 and skin sheet side walls 112 have holes 106 therein. The bolt of the clamp passes through hole 106. Side wall, as used herein, refers to a part of a skin sheet or channel that extends in a generally radial direction, away from the circumference of the skin sheet or channel. A side wall need not be straight, and can be contoured. Hole in a side wall, as used herein, refers to an opening in the side wall that can be completely closed on its perimeter, or open on part of its perimeter.

Figure 4:
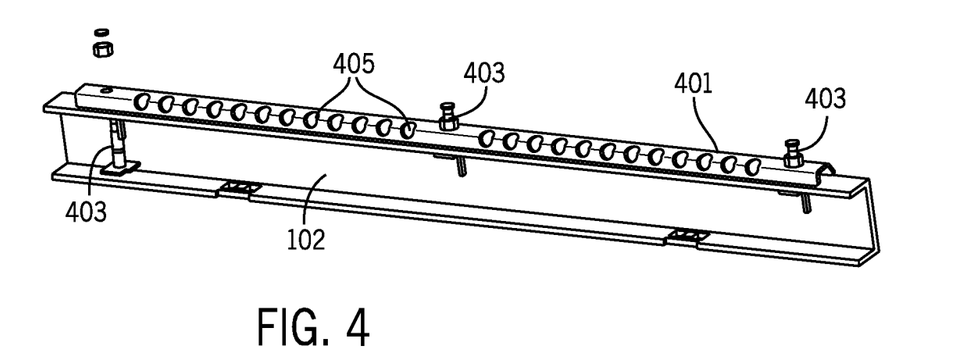
FIG. 4 is a structural channel and clamps.

FIG. 4 shows a structural channel 102 with a respective clamp bar 401 and clamps 403. Each clamp 403 include a portion of clamp bar 401. Clamp bar 401 has holes 405. The bolt of each clamp 403 passes through one of the holes of clamp bar 401.

Figure 5:
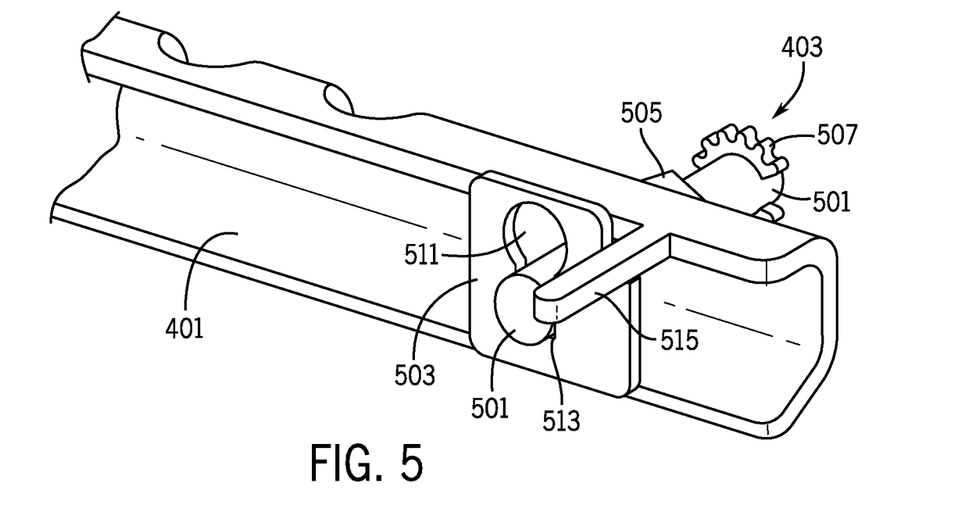
FIG. 5 is a clamp.
Figure 6:
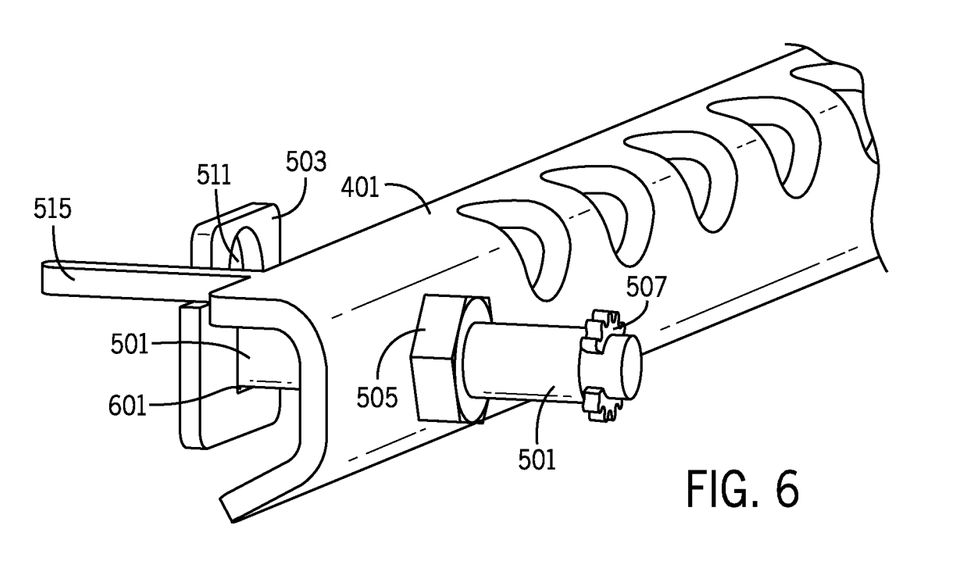
FIG. 6 is another view of the clamp of FIG. 5.

FIG. 5 shows a clamp 403, which includes a portion of clamp bar 401, a bolt 501, a retaining plate 503, a nut 505, and a nut retaining ring 507. Retaining plate 503 has a plate hole 511 and plate slot 513 combination. Bolt 501 can pass through plate hole 511, but can only fit into plate slot 513 if there are grooves on bolt 501 (seen on FIGS. 6-8). When bolt 501 is in slot 513 the width of bolt 501 other than at the groove is greater than the width of slot 513, so rotation of bolt 501 with respect to plate 513 is prevented. A part 515 of clamp bar 401 is shaped and extends to prevent plate 503 from rotation with respect to clamp bar 401. FIG. 6 shows a different view of clamp 403, and groove 601 in bolt 501 may be seen.

Figure 7:
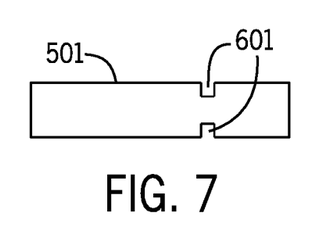
FIG. 7 is a top view of the bolt in FIGS. 5 and 6.
Figure 8:
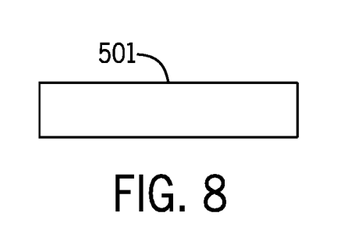
FIG. 8 is a side view of the bolt in FIGS. 5 and 6.

FIGS. 7 and 8 show top and side views of bolt 501. Grooves 601 may be seen in the top view of FIG. 7. The preferred embodiment provides for two opposing grooves. Alternatives include using other than two grooves, including one groove on one side, or a different shaped groove, and grooves that extend farther along the length of bolt 501. The groove or grooves should be chosen to prevent rotation of bolt 401 with respect to bolt 501. The side view of bolt 501 in FIG. 8 shows that the grooves extends only a portion of the circumference of bolt 501, so that the full diameter portion of the bolt prevents turning in slot 601.

Figure 9:
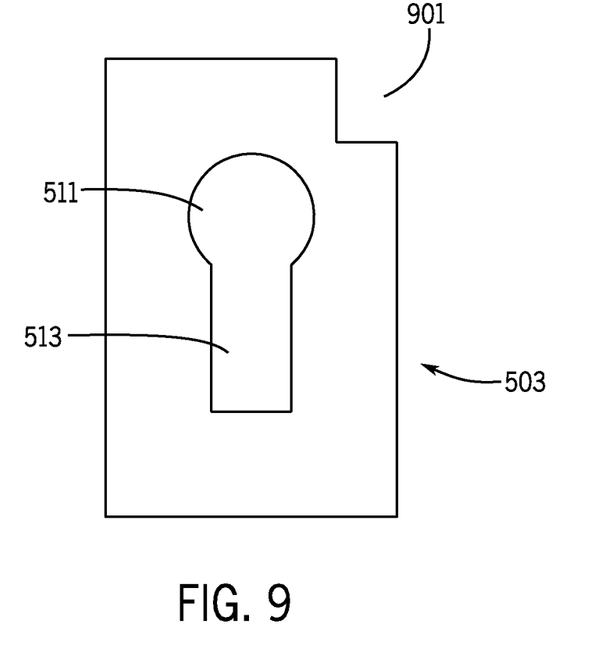
FIG. 9 is a front view of the retaining plate in FIGS. 5 and 6.

FIG. 9 shows a front view of retaining plate 503, which includes hole 511, slot 513 and notch 901. Hole 511 is sized to allow the full diameter of bolt 501 to pass therethrough. Slot 513 is sized to allow only grooves 601 of bolt 501 to fit therein. Notch 901 is positioned and sized to cooperate with part 515 of clamp bar 401 to prevent rotation of plate 503 with respect to clamp bar 401.

Figure 10:
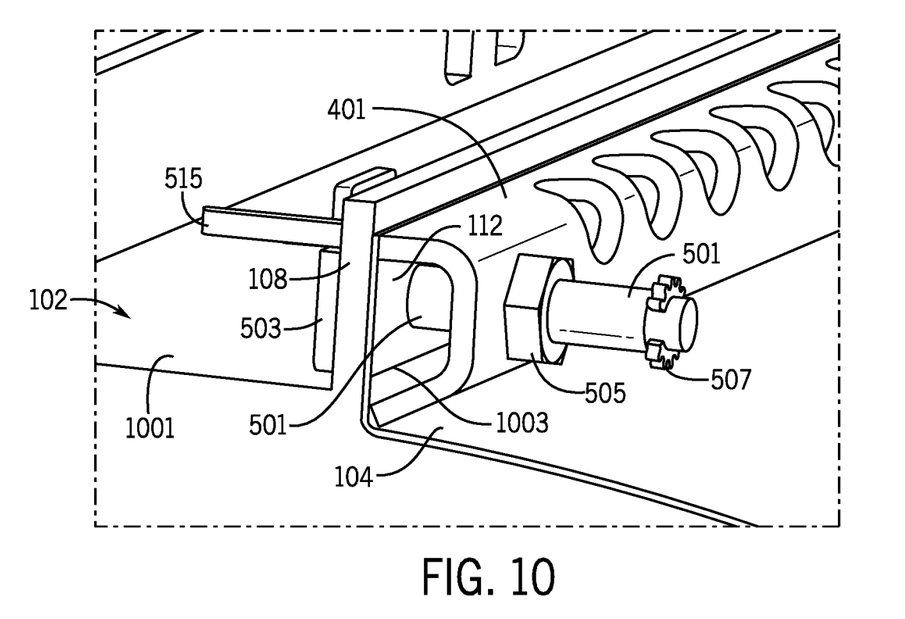
FIG. 10 is the clamp of FIGS. 5 and 6, and includes the skinsheet and structural channels.

FIG. 10 shows clamp 403 installed, holding skinsheet sidewall 112 of skinsheet 104 against structural channel sidewall 108 of structural channel 102. To install clamp 403 part 515 of clamp bar 401 passes through a hole (or over the top of) channel sidewall 108. Bolt 501 is inserted through holes in clamp bar 401, skinsheet sidewall 112 and channel sidewall 108. Plate hole 511 of retaining plate 503 is slid over bolt 501. Plate slot 513 is aligned with grooves 601, and bolt 501 is inserted into slot 513. This prevents rotation of bolt 501 with respect to plate 503. Notch 901 is aligned with part 515. This prevents rotation of plate 503 with respect to clam bar 401. Bolt 505 is tightened, clamping skinsheet sidewall 112 against structural channel sidewall 108. Retaining ring 507 prevents nut 505 from being removed from bolt 501. When tightened, the clamp is in the operating position.

The blancher/cooler may be cleaned in place by loosening nut 505, allowing skinsheet sidewall 112 of to move away from structural channel sidewall 108. Alternatively, the blancher/cooler may be cleaned by removing retaining ring 507 and nut 505, and the skinsheets may be removed. Retaining ring 507 is omitted in one alternative.

The shape of structural channel 102 also helps prevent rotation of plate 503. A tangential floor 1001 is smooth and generally flat (with some curvature in the circumferential direction). The generally flat surface cooperates with the flat lower edge of plate 503 to prevent rotation. In various alternatives only one of part 515/notch 901 or tangential floor 1001 are used to prevent rotation of plate 503 with respect to channel 102.

Figure 11:
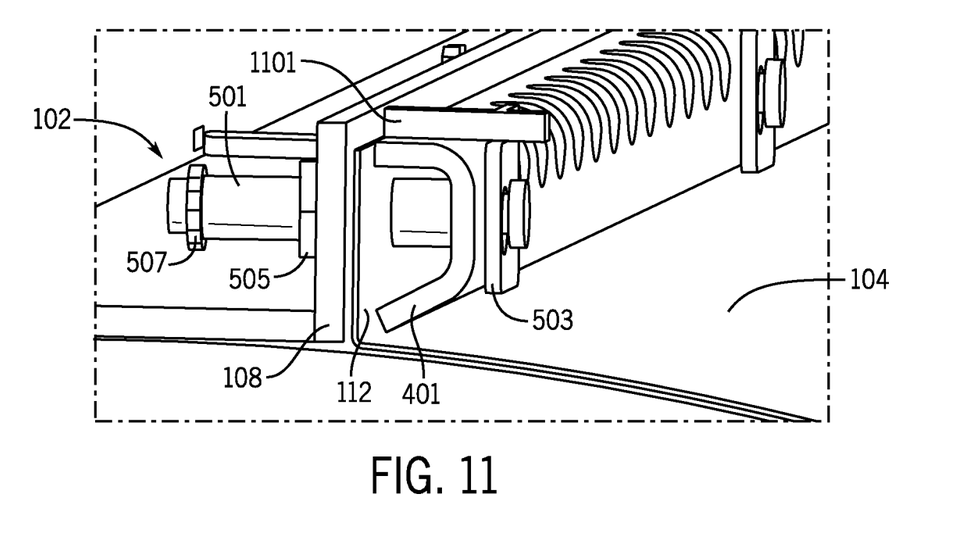
FIG. 11 is an alternative clamp with skinsheet and structural channels.
Figure 12:
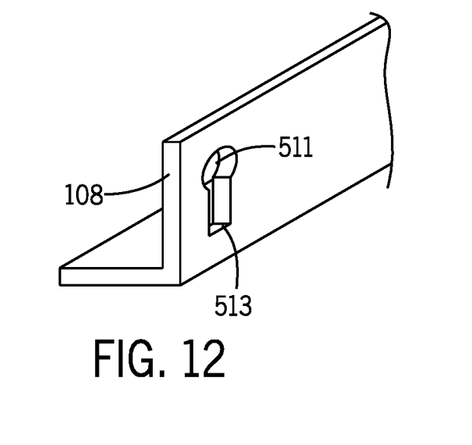
FIG. 12 is a front view of a hole slot combination in a channel sidewall.
Figure 13:
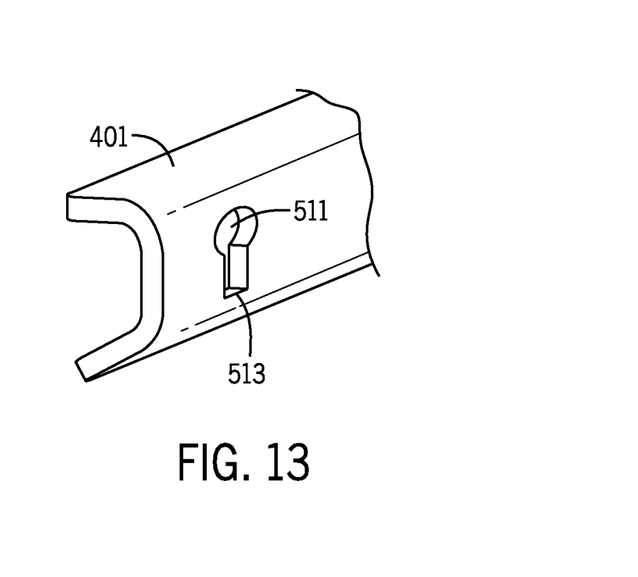
FIG. 13 is a front view of a hole slot combination in a clamp bar.

Another alternative provides for bolt 501 to be flipped, as shown in FIG. 11, so that nut 505 is in channel 102 and plate 503 is outside channel 102. In this embodiment plate 503 can be on the outside of clamp bar 401 (where nut 405 is in FIG. 10), or within an area 1003 on FIG. 10. When plate 503 is in area 1003, the shape of clamp bar 1003 prevents rotation. The embodiment of FIG. 11 includes a part 1101 of plate 503 that extends to stop rotation of plate 503. Other alternatives provides for slot 513 and hole 511 to be in side wall 108 (FIG. 12) or clamp bar 401 (FIG. 13). In these embodiments the slot/groove combined with the structure of the sidewall and/or clamp bar prevent rotation. Other alternatives provide for plate 503 to be affixed to the channel or clamp bar by welding, and/or to use a standard bolt welded into place, and/or preventing rotation in some other manner.

Figure 14:
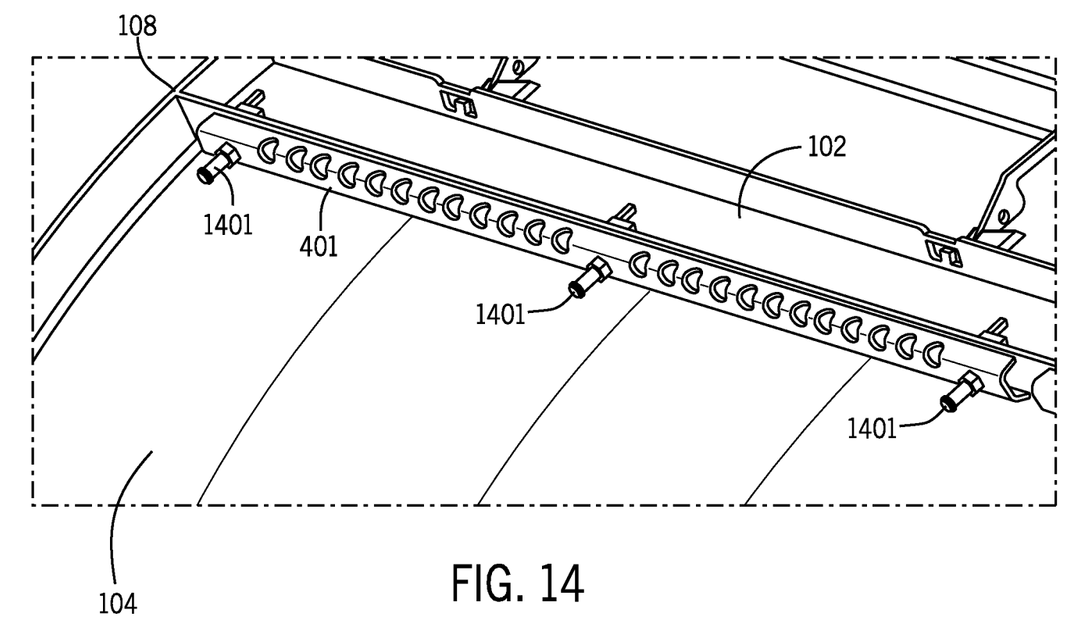
FIG. 14 is a skinsheet section clamped to a structural channel.

FIG. 14 shows skinsheet section 104 clamped to sidewall 108 of channel 102, using clamps 1401. Clamp bar 401 extends the width of the drum. In this alternative the channels do not alternate with skinsheet sections. Rather, they are adjacent, with other components (such as removable doors) completing the drum.

Numerous modifications may be made to the present disclosure which still fall within the intended scope hereof Thus, it should be apparent that there has been provided a method and apparatus for a blancher/cooler that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A rotary drum blancher/cooler for processing food, comprising a drum, wherein the drum comprises:
    a skinsheet, comprised of a plurality of sections, each section have skinsheet sidewalls at opposing ends;
    a plurality of structural channels, each structural channel having channel sidewalls at opposing edges, wherein the drum is at least partially formed by adjacent skinsheet sections and structural channels; and
    a plurality of clamps, wherein each of the plurality of clamps comprises:
        at least a portion of a clamp bar to hold each respective skinsheet sidewall between a respective structural channel sidewall and the at least a portion of a clamp bar, wherein the at least a portion of a clamp bar has at least one clamp bar hole therein; and
        a bolt extending through the at least one hole in the at least a portion of a clamp bar, having a first end at least partially threaded, and a second end with at least one groove, wherein one of the first end and second end is disposed within the respective one of the plurality of structural channels, and wherein one of the first end and second end is disposed outside the respective one of the plurality of structural channels;
        a slot and hole combination, wherein the bolt can pass through the hole of the slot and hole combination, and wherein the at least one groove in the bolt is disposed within the slot, such that the bolt cannot rotate with respect to the slot, wherein the slot and hole combination is located in at least one of a retaining plate, the respective structural channel sidewall and the at least a portion of a clamp bar; and
        a nut mounted on the first end, wherein the nut may be tightened to hold the respective skinsheet sidewall against the respective channel sidewall or loosened to allow the respective skinsheet side wall to move away from the respective channel sidewall.

2. The rotary drum blancher/cooler of claim 1, further comprising a retaining plate, wherein the slot and hole combination are located in the retaining plate, and wherein the retaining plate is disposed such that rotation of the retaining plate with respect to at least one of the respective structural channel and the at least a portion of a clamp bar is prevented.

3. The rotary drum blancher/cooler of claim 2, wherein the retaining plate is disposed in the respective structural channel such that rotation of the retaining plate with respect to the respective structural channel is prevented, and wherein the first end of the bolt is located outside of the respective structural channel.

4. The rotary drum blancher/cooler of claim 3, further comprising a nut retaining ring mounted on the first end of the bolt.

5. The rotary drum blancher/cooler of claim 4, wherein the shape of the at least a portion of a clamp bar prevents rotation of the plate.

6. The rotary drum blancher/cooler of claim 4, wherein the shape of the respective structural channel prevents rotation of the plate.

7. The rotary drum blancher/cooler of claim 6, wherein the at least a portion of a clamp bar includes a part that extends into the structural channel that prevents rotation of the plate.

8. The rotary drum blancher/cooler of claim 7, wherein the respective structural channel includes a tangential floor, and wherein the tangential floor prevents rotation of the plate.

9. The rotary drum blancher/cooler of claim 8, wherein the at least one groove is two grooves.

10. The rotary drum blancher/cooler of claim 2, wherein the retaining plate is disposed outside of the respective structural channel, and wherein the first end is located in the respective structural channel, and wherein the shape of the at least a portion of a clamp bar prevents rotation of the plate.

11. The rotary drum blancher/cooler of claim 1, wherein the slot and hole combination are located in the respective channel sidewall.

12. The rotary drum blancher/cooler of claim 1, wherein the slot and hole combination are located in the at least a portion of a clamp bar.

13. A clamp for a rotary drum blancher/cooler for processing food, wherein the rotary drum blancher/cooler includes a drum having a skinsheet, comprised of a plurality of sections with each section having skinsheet sidewalls at opposing ends, a plurality of structural channels with each structural channel having channel sidewalls at opposing edges, wherein the clamp comprises:
    at least a portion of a clamp bar to hold a respective skinsheet sidewall between a respective channel sidewall and the at least a portion of a clamp bar, wherein the at least a portion of a clamp bar has at least one clamp bar hole therein; and
    a bolt extending through the at least one hole in the at least a portion of a clamp bar, having a first end at least partially threaded, and a second end with at least one groove, wherein one of the first end and second end is disposed within the respective one of the plurality of structural channels, and wherein one of the first end and second end disposed outside the respective one of the plurality of structural channels;

a slot and hole combination, wherein the bolt can pass through the hole of the slot and hole combination, and wherein the at least one groove in the bolt is disposed within the slot, such that the bolt cannot rotate with respect to the slot, wherein the slot and hole combination is located in at least one of a retaining plate, the respective channel sidewall and the at least a portion of a clamp bar; and a nut mounted on the second end, wherein the nut may be turned tightened to hold the respective skinsheet sidewall against the respective channel sidewall or loosened to allow the respective skinsheet side wall to move away from the respective channel side wall.

14. The clamp blancher/cooler of claim 13, further comprising a retaining plate, wherein the slot and hole combination are located in the retaining plate, and wherein the retaining plate is disposed such that rotation of the retaining plate with respect to at least one of the respective structural channel and the at least a portion of a clamp bar is prevented.

15. The clamp of claim 14, wherein the retaining plate is disposed in the respective structural channel such that rotation of the retaining plate with respect to the respective structural channel is prevented, and wherein the second end of the bolt is located outside of the respective structural channel.

16. The clamp of claim 15, further comprising a nut retaining ring mounted on the first end of the bolt.

17. The clamp of claim 16, wherein the shape of the at least a portion of a clamp bar prevents rotation of the plate.

18. The clamp of claim 14, wherein the shape of the respective structural channel prevents rotation of the plate.

19. The clamp of claim 13, wherein the retaining plate is disposed outside of the respective structural channel, and wherein the first end is located in the respective structural channel, and wherein the shape of the at least a portion of a clamp bar prevents rotation of the plate.

20. The clamp of claim 13, wherein the slot and hole combination are located in the at least a portion of a clamp bar.

* * * * *